June 24, 1930.  W. B. LASKEY  1,765,872
METHOD OF AND MACHINE FOR FORMING CONFECTIONS HAVING IRREGULAR SHAPES
Filed Dec. 21, 1925  7 Sheets-Sheet 1

INVENTOR
*William Bartlett Laskey*
BY
*Gustav Drews*
ATTORNEY

June 24, 1930.  W. B. LASKEY  1,765,872
METHOD OF AND MACHINE FOR FORMING CONFECTIONS HAVING IRREGULAR SHAPES
Filed Dec. 21, 1925  7 Sheets-Sheet 3

INVENTOR
William Bartlett Laskey.
BY Gustav Drews
ATTORNEY

June 24, 1930.  W. B. LASKEY  1,765,872
METHOD OF AND MACHINE FOR FORMING CONFECTIONS HAVING IRREGULAR SHAPES
Filed Dec. 21, 1925  7 Sheets-Sheet 5

INVENTOR
William Bartlett Laskey.
BY
Gustav Drews
ATTORNEY

June 24, 1930.  W. B. LASKEY  1,765,872
METHOD OF AND MACHINE FOR FORMING CONFECTIONS HAVING IRREGULAR SHAPES
Filed Dec. 21, 1925  7 Sheets-Sheet 6

INVENTOR
William Bartlett Laskey.
BY
Gustav Drews
ATTORNEY

June 24, 1930.  W. B. LASKEY  1,765,872

METHOD OF AND MACHINE FOR FORMING CONFECTIONS HAVING IRREGULAR SHAPES

Filed Dec. 21, 1925  7 Sheets-Sheet 7

INVENTOR
William Bartlett Laskey.
BY Gustav Drews
ATTORNEY

Patented June 24, 1930

1,765,872

UNITED STATES PATENT OFFICE

WILLIAM BARTLETT LASKEY, OF BROOKLYN, NEW YORK, ASSIGNOR TO MASON, AU & MAGENHEIMER CONFECTIONERY MANUFACTURING COMPANY, OF BROOKLYN, NEW YORK, A CORPORATION OF WEST VIRGINIA

METHOD OF AND MACHINE FOR FORMING CONFECTIONS HAVING IRREGULAR SHAPES

Application filed December 21, 1925. Serial No. 76,570.

This invention relates in general to the methods of, and machines for, forming confections, and more especially to the methods of, and machines for, forming confections and confection centers composed of a plastic material, semi-fluid in state, during the forming process.

In practice, considerable difficulty has been encountered in properly forming by machinery, confections and confection centers composed of a plastic material, semi-fluid in state during the forming operation, especially when such confections or confection centers were to be formed into certain predetermined irregular shapes other than the ordinary rectangular shapes. Such difficulty has been particularly pronounced when forming plastic material having the general composition of cocoanut, peanut and fruit bars, patties and the like, such as plastic material having imbedded therein or mixed therewith certain cellular or fibrous ingredients, as, for instance, shredded or comminuted cocoanut, or nut or fruit elements, either chopped or intact.

To this end, the present invention has for a main object to provide a new method of, and machine for, forming confections composed of a plastic material containing more or less coarse components into certain predetermined irregular shapes such as candies having a plurality of predetermined protrusions or an irregular surface defining the projecting fibrous or cellular coarse components contained in nut bars, cocoanut bars and the like.

Specifically, the present invention contemplates a new method for forming by machinery in predetermined irregular shapes, plastic material containing more or less coarse components, such method consisting in gathering predetermined units of material, forming the sides of said units during such gathering process, then advancing such gathered units, and then forming the upper surfaces of the units by forming dies.

Specifically, the present invention still further contemplates a new method for forming by machinery in predetermined irregular shapes, plastic material containing more or less coarse components, such method consisting in selecting a predetermined unit of material in a container by forming dies, then opening a discharge mouth of said container, thereupon discharging such unit through said mouth, thereupon forming the upper surface of said unit and severing the finally completed product from the unit discharged, and thereupon returning to the container the surplus material of the unit discharged.

The present invention also contemplates a machine for carrying out the methods aforesaid. To this end, the invention specifically contemplates the provision of a container for plastic material, there being a discharge opening in said container, selecting dies for selecting and forming the sides of a unit, a plunger for discharging such unit through the discharge opening, forming dies for forming the upper surface of the completed product and severing the completed product from the unit discharged, there being a return opening in said container for receiving the surplus material of the unit discharged, and a scraper cooperating with said latter forming dies to strip the surplus material from said forming dies and return it to the container through said return opening, the upper surface of said scraper preferably being formed to close the initial discharging opening of said container and to serve as a support and forming die to form the lower surface of the succeeding product before it is discharged from the container.

The present invention still further contemplates a method of, and a machine for carrying out such method, whereby a confection irregular in outline in imitation of a hand formed confection may be produced, having the fluffy inner texture and the irregular outer surface of a hand-made product outlining and defining the portions of coarse components such as cocoanut shreds, coarsely ground nut products or nut products in the whole which may project from the surface of the plastic mass. To this end, the finishing of the plastic products is formed while the unit projected or discharged from the container is maintained in a suspended position while still in a semi-fluid condition thereby permitting it to expand to its normal fluffy texture before being deposited in its final shape.

The present invention also contemplates improved features of construction particularly adapted for producing products in imitation of hand-made goods.

These and other features, capabilities and advantages of the invention will appear from the subjoined detail description of a method forming, by example, a part of the present invention, and a machine constituting one embodiment of another part of the present invention, illustrated in the accompanying drawings in which.

Figures 1, 9, 11:
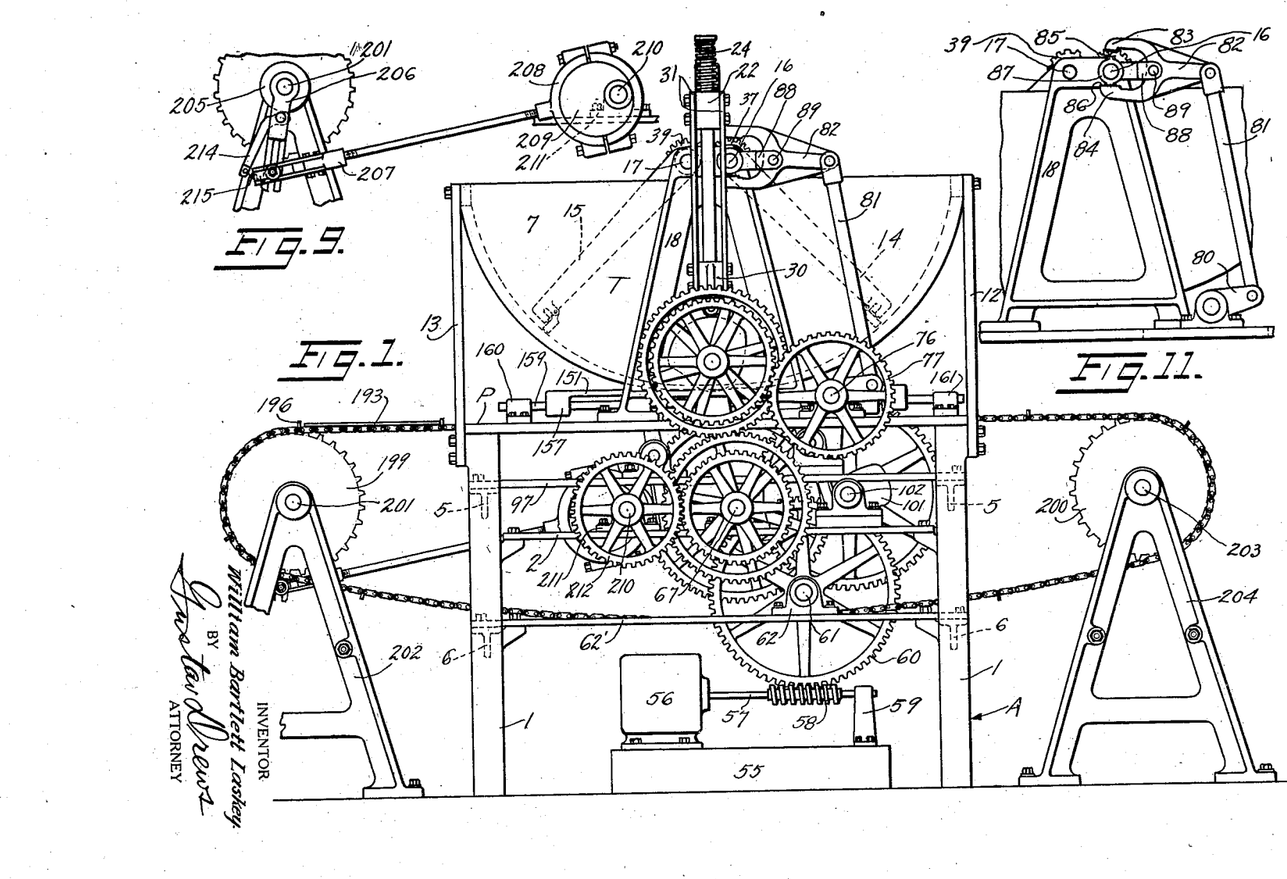
Figure 1 is a side elevation of the completed machine.
Fig. 9 is an elevation of the pawl action for the conveyor removed from the machine.
Fig. 11 is a fragmental side elevation showing the lever connection for actuating the former arms.
Figures 2, 10:
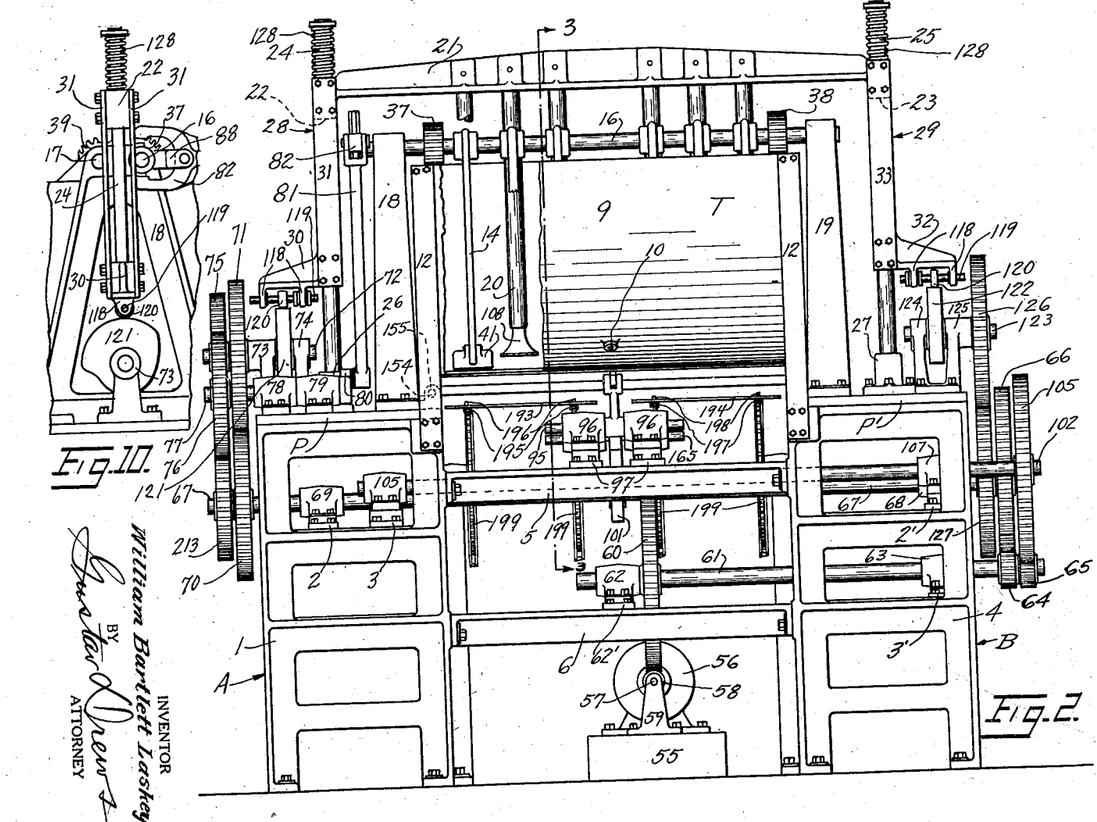
Fig. 2 is an end elevation of the completed machine.
Fig. 10 is a fragmental side elevation showing the lifting cam and vertically reciprocating frame removed from the machine.

In the embodiment illustrated, see Figs. 1 and 2, there is provided a main frame having two lateral frames A and B, the frame A consisting of two pairs of side frame members 1 which are secured to one another and spaced from one another by suitable crosspieces 2, 3, and a platform P, and the frame B consisting of two side frame members 4 which are also secured to one another by cross pieces 2', 3' and a platform P'. The frame members 1 and 4 in turn are secured to one another and thereby spaced from one another by suitable upper T sections 5, and lower T sections 6. Above the T sections 5 and 6 between the said frames A and B there is disposed a tank T. This tank T preferably has two plane side walls 7, 7 which have plane upper edges subjoining the curved lower edges 8. To the curved lower edges of the side walls 7 there is secured the curved wall member 9 forming the bottom and end walls of the tank T.

Figure 3:
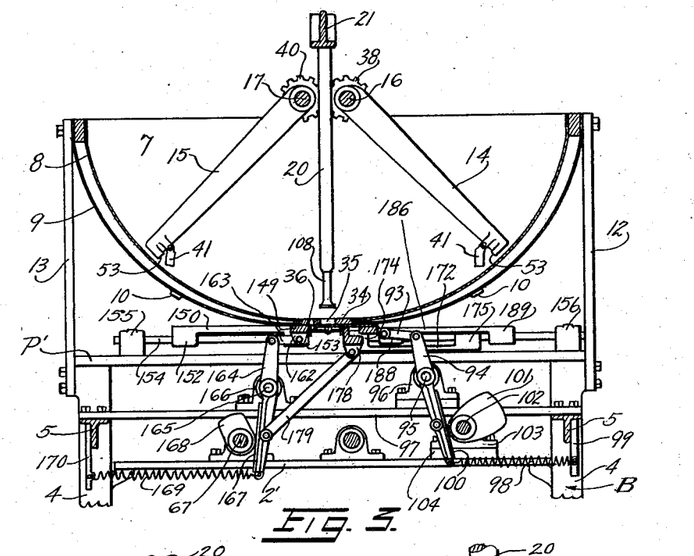
Fig. 3 is a section on the line 3—3 of Fig. 2 with parts thereof removed and other parts broken away.

The contents of the tank T may be required to be heated and for this purpose the walls 7 and 9 are preferably formed of copper and comprise two spaced apart wall sections as illustrated in Fig. 3 to form a jacket for receiving hot water, steam, or the like. In the present instance, the jacket is provided with steam inlets 10 and steam outlets 11. For properly supporting the tank T in position on the frames A and B, the uprights 12, 12 and 13, 13 are provided which in the present instance are secured to the upper edges of the curved wall member 9 and the upper ends of the side frames 1 and 4.

The wall member 9 of the tank T is rounded to correspond substantially with the path of movement of the lower ends of the swinging arms 14 and 15. The arms 14 are secured to the shaft 16 and the arms 15 to the shaft 17. The shafts 16 and 17 extend across the tank T projecting beyond the upper edges of the side walls 7, 7 of the tank T and are operatively supported in the journals formed in the upper ends of the A frames 18 and 19, the frame 18 being secured to the platform P on the side frame A adjacent to the tank T, and the frame 19 being supported on the platform P' supported on the side frame B adjacent to the tank T. In addition to the arms 14 and 15 also operating in the tank T, there are provided vertically reciprocating plungers 20. The plungers 20 are secured at their upper ends to the cross-arm 21. The cross-arm 21 is provided with sleeves 22 and 23 at its ends to receive the vertical guide rods 24 and 25. The guide rod 24 is secured in place on the platform P by the support 26 and the guide rod 25 is secured in place on the platform P' by the support 27. The sleeves 22 and 23 are secured to the vertically reciprocating brackets generally designated by the reference characters 28 and 29 respectively. The bracket 28 has a lower casting member 30 provided with an opening to receive the rod 24 and is fixedly secured to the sleeve 22 by the side bars 31. The bracket 29 is provided with a casting 32, similar to the casting 30, which has an opening for receiving the rod 25 and is fixedly secured to the sleeve 23 by the side bars 33.

The steam jacket of the tank T is interrupted the full length of the tank at the bottom thereof from side wall 7 to side wall 7 to receive the bar 34 which is provided with a plurality of discharge openings corresponding in outline to the conformation of the shapes of the products to be formed. Such openings are designated in the drawings by the reference character 35. In the present instance, there are provided six such openings 35. Adjacent to each of these openings, there is provided an elongated slot 36 forming a return opening, in the present instance corresponding to the length of an opening 35 and slightly narrower in width. The openings 35 form discharge openings through which units of plastic material are discharged from the tank T, and the openings 36 form inlets or return openings to permit the surplus material discharged from the openings 35 to be returned to the tank T. The discharge openings 35 are also shaped to conform with the shapes of the sides of the units being discharged to guide such units as they are discharged and to maintain their shapes as they are discharged.

In the operation of the machine, the tank T is filled with a plastic mass from which units of various shapes are to be formed. The machine is especially adapted for forming units out of a plastic mass having a semi-fluid consistency during the forming process and containing therein coarse components such as shredded or comminuted cocoanut particles, or other fibrous or cellular coarse components such as nut and fruit particles either comminuted or in the whole. The heating of the machine, and thereby the heating of the contents thereof is provided in order to maintain the contents in a semi-fluid state if the character of the plastic mass is such that heat is required to maintain a semi-fluid consistency when heated.

In the operation of this machine, a plurality of units are selected to the tank T, the sides thereof initially formed during such selection, whereupon such selected units are extruded from the tank T and, after being extruded and preparatory to being deposited on a conveyor or the like, further engaged, the upper surface thereof formed, and thereupon the surplus or excess material of the extruded units returned through the openings 36 into the tank T.

In the operation of this machine the selecting elements, being the first to operate on the units to be extruded, will first be explained and described.

*Selecting elements*

Figure 4:
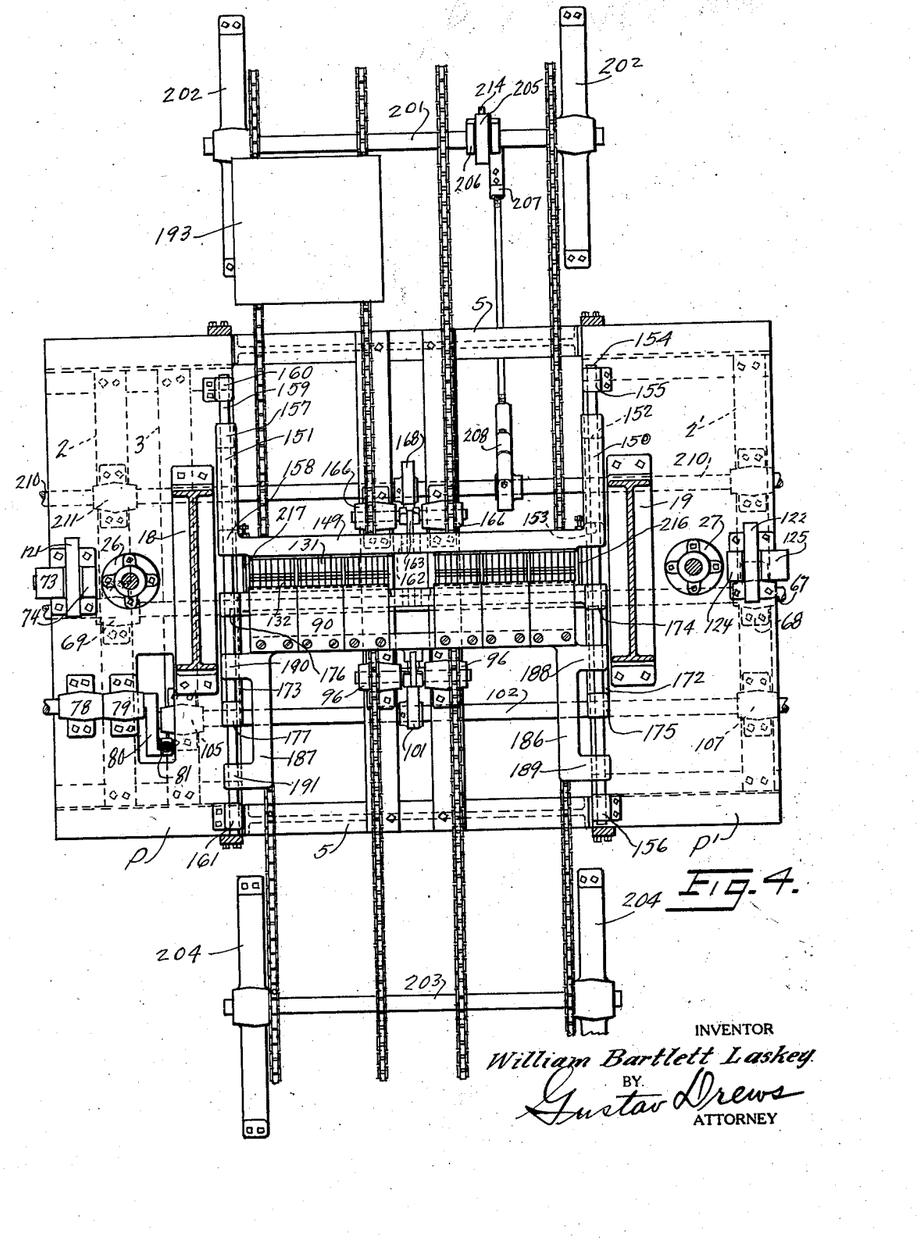
Fig. 4 is a plan of the completed machine with the upper parts including the tank removed.
Figure 14:
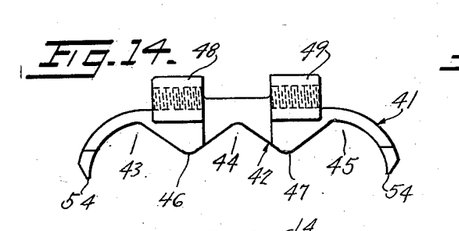
Fig. 14 is a plan view of one of the flapper blades removed.
Figure 15:
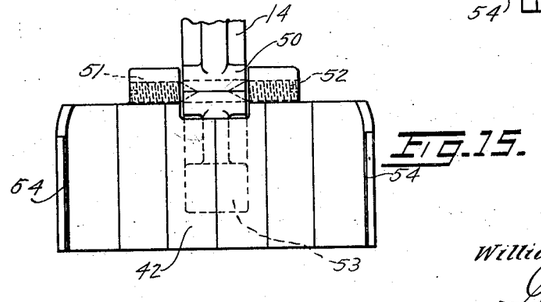
Fig. 15 is a side elevation and Fig. 16 is an end elevation of one of the flapper blades in position on a former arm, the upper part of the former arm being broken away.
Figure 16:
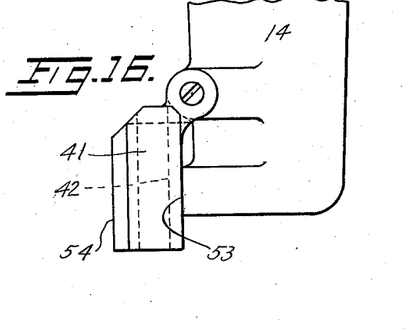

The selecting elements consist essentially of the arms 14 and 15, each arm 14 cooperating with an arm 15 to select a unit. In the present instance there are provided six arms 14 and a like number of arms 15. Each arm 14 alines with its cooperating arm 15 to form a pair, which are operated to move toward one another and from one another by means of the shafts 16 and 17 which have secured thereon and in mesh with one another two sets of gears, the shaft 16 having secured thereon the gears 37 and 38 and the shaft 17 having secured thereon the gears 39 and 40, the gear 37 being in mesh with the gear 39, and the gear 38 being in mesh with the gear 40 so that the shafts 16 and 17 will be simultaneously operated and in turn simultaneously operate the arms 14 and 15 toward one another and away from one another. On the lower ends of each of the arms 14 and 15 there is formed a flapper or initial side forming die plate 41. The form of the flappers 41 and the mounting of the same on each of the arms 14 and 15 will be substantially identical and, therefore, it will suffice to describe but one of them and the mounting of the same on one of the arms 14. The flapper 41 as shown in Figs. 14, 15 and 16, in the present instance consists of a casting having an inner face 42 provided with three depressions 43, 44 and 45 defined by the two protrusions 46 and 47. The lower edge of the plate 41 lies in a plane and in the operation of the device when selecting a unit, slides along and adjacent to the inner face of the wall 9 of the tank T. Extending outwardly and upwardly from the plate 41 there are formed two ears or journals 48 and 49 to receive between them the ear or journal 50, on one side of the arm 14 and spaced from the extreme lower end 53 of the arm 14. The plate 41 may be pivotally secured to the arm 14 in any suitable manner. In the present instance, the pivoting element consists of two screws 51 and 52, the screw 51 being screw-threadedly connected in the ear 48 and having its tapered end extend into a tapered orifice in one end of the ear 50, and the screw 52 being screw-threadedly connected in the ear 49 and having its tapered end extend into the tapered orifice in the other end of the ear 50. In the operation of these arms 14 and 15, the plates or flappers 41 of each arm will have their irregular faces oppose one another and as the arms sweep toward one another, the flappers will be spread outwardly against the lower ends 53 of the arms 14 and 15 and come to a stop when the edges 54, 54 of the flappers 41 engage one another as shown in Fig. 4. In such position the flappers 41 will have selected between them a unit of plastic material and initially formed the lateral sides thereof.

When the arms 14 and 15 swing away from one another, the pivotal connection of the flappers 41 with such arms serves to facilitate the outward swing of the arms 14 and 15 to reduce the friction in that the flappers may be pivoted inwardly away from the ends or faces 53 of the arms 14 and 15, and feather along the inner surface of the wall 9 as shown in Fig. 3.

In order to describe the mechanism for operating the arms 14 and 15, it will be desirable at this time to describe the main drive and transmission from the main drive to the arms 14 and 15.

In the present instance, below the tank T between the side frames A and B, there is provided a support 55 on which is secured a motor 56 having a shaft 57 provided with a worm 58, the shaft 57 being journaled at its outer end in the bracket 59. The worm 58 meshes with the worm wheel 60 secured to the shaft 61 journeled in the supports 62 and 63, the support 62 being mounted in the present instance on the cross-bar 62' secured at its ends on the T sections 6, 6, and the support 63 being mounted on the cross-piece 3', see Figs. 1 and 2. The shaft 61 extends beyond the support 63 laterally of the side frame B and has secured on such protruding extension the pinions 64 and 65. The pinion 64 meshes with the gear 66 on the shaft 67 which is supported in the journal 68 secured in place on the cross-bar 2' of the frame B, the shaft 67 extending across to the frame A, and there being secused in place by the journal 69 mounted on the cross-bar 2. The shaft 67 then extends outside of the frame A and has secured on such protruding extension the gear 70 which meshes with the gear 71 mounted on the shaft 72 which is journaled in the brackets 73, 74 supported on the platform P of the side frames A. Such shaft 72 extends beyond the gear 71 and has fixed thereon the gear 75 which meshes with the gear 76 on the shaft 77 mounted in the journals 78 and 79 also supported on the platform P of the side frame A. On the inner end of the shaft 77 there is secured the crank 80 to the outer end of which is pivotally connected the link 81. Such link 81 has its upper free end pivotally connected to the bifurcated bracket 82. The bifurcated bracket 82 has two forks 83 and 84 which receive between them the stop faces 85 and 86 respectively of the boss 87. The shaft 16 extends through the boss 87 and has fixed thereto the arm 88 which is pivotally connected to the crotch of the bifurcated bracket 82 at 89. In neutral position the brackets 83 and 84 are spaced from the stop faces 85 and 86. In the operation of the machine, the motor 56 through the shaft 57, worm 58, gear 60, pinion 64, gears 66, 70, 71, 75 and 76 rotate the shaft 77 to actuate the crank 80, in turn to actuate the link 81, bifurcated bracket 82 and arm 88, to rock the shaft 16. As the shaft 16 is reciprocated, through the meshing of the gear 37 with the gear 39, and the gear 38 with the gear 40, the shaft 17 will likewise be rocked, whereby the arms 14 and 15 will be swung to and from one another.

It is desired that, as the flappers 41 of a pair of arms 14 and 15 engage one another, they will remain in such position for a short period to permit the discharge of the units from between them before they again separate. To this end, the actuation of the crank 80 and bifurcated bracket 82 is so timed that when the free end of the crank 80 passes through its dead centers relative to its connection with the link 81, whereby the link 81 will change from its downward pull on the bracket 82 to an upper thrust, and the likewise change from its upward thrust to its downward pull, such idle moment will be exaggerated by the distance required for the fork 83 or 84 which has not been in engagement with its stop face to move over the distance between it and the stop face to be engaged before the fork 83 or 84 will come into engagement with its stop face and cause the arm 88 again to be actuated. Of course, such dwell will also take place when the flappers 41 of the arms 14 and 15 are in their extreme upper position and at this position, they will permit the flappers 41 which have been deflected away from the ends 53 while the arms 14 and 15 recede from one another, gradually or slowly again to assume their position where they engage such ends 53 whereupon the arms 14 and 15 are again caused to approach one another.

*The discharging elements*

The next elements to function so far as concerns the actuation on the plastic mass, are the elements for discharging units of the plastic mass from the tank T.

Figures 5, 6:
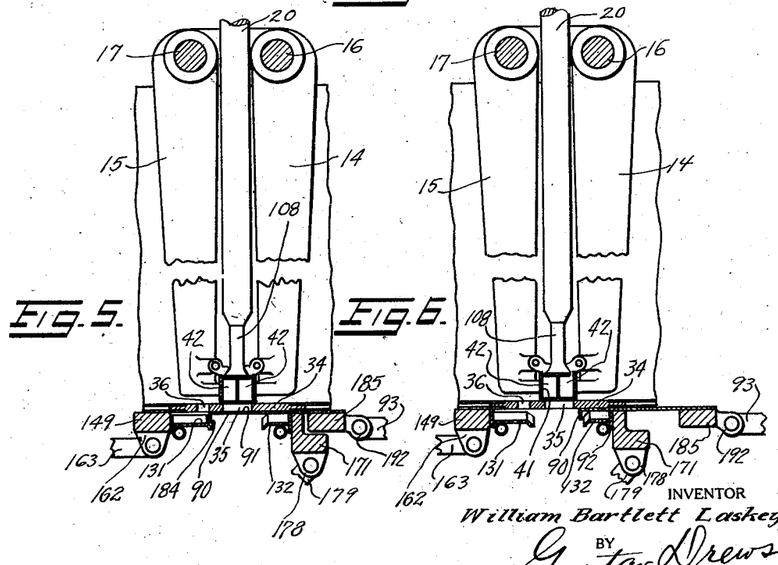
Figs. 5, 6, 7 and 8 are sections enlarged relative to Fig. 3 and showing successive positions of the active parts relative to the position of such parts as shown in Fig. 3.
Figure 7:
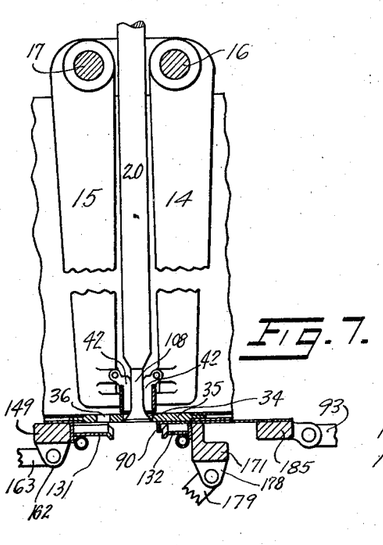
Figure 8:
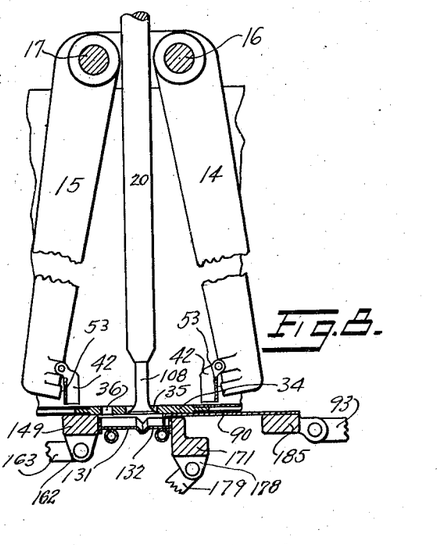
Figure 12:
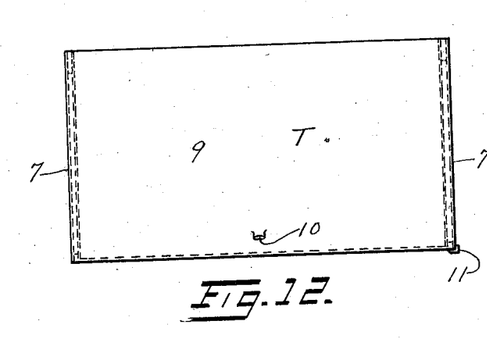
Figs. 12 and 13 are side and end elevations respectively of the tank removed.
Figure 13:
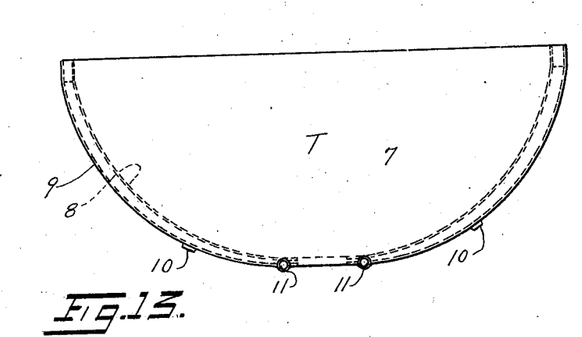

Before the flappers 41 move toward one another as shown in Fig. 3 and until after they have moved into engagement with one another as shown in Fig. 5, the scraper blades or pusher plates 90 which have an upper plane face 91, are disposed in position for closing the openings 35. After the flappers 41 have engaged one another, the scraper blades 90 are caused to slide to one side into the position shown in Fig. 5 to clear the openings 35 and thus permit the units of plastic material to be discharged from such openings 35.

The scraper blades 90 are slidably supported in engagement with the lower face of the die plate 34, slidably engaging the upper surface of the projection 92. The scraper blades 90 are further guided by the blade carrier and secured to the scraper blade carrier 185 which is pivotally connected to the link 93, the link 93 being pivotally connected to the upper end of the lever 94 fulcrumed on the shaft 95, journaled in the supports 96 which are mounted on the bars 97 supported by the T sections 5.

The spring 98 connects the lower end of the lever 94 with the abutment 99 extending down from one of the sections 5, as shown in Fig. 3, the spring 98 normally maintaining the cam face 100 on the lower extension of the lever 94 in engagement with the cam 101 fixed on the shaft 102 journaled in the bearings 103 supported on the bar 104 which bar 104 in turn is mounted on the bars 3 and 2′.

In order to actuate the cam 101, the shaft 102 on which it is mounted has secured thereto the gear 105 which is located outside of the side frame B on the shaft 102 projecting beyond such side frame B. The shaft 102, as shown in Fig. 2, is supported in the bracket 106, mounted on the bar 3, and is also supported in the bracket 107 mounted on the bar 2′. Such gear 105 meshes with the pinion 65 on the shaft 61. The timing of the actuating means for the scraper blades or pusher plates 90 is such that the scraper blades will move out of closing position to clear the openings 35 after the flappers 41 of a pair of arms 14 and 15 have come into engagement with one another and before the discharging plungers 20 descend to discharge the units selected by pairs of flappers 41, and return to close the openings 35 after the plungers 20 have been actuated into their descended position.

Figures 19, 20:
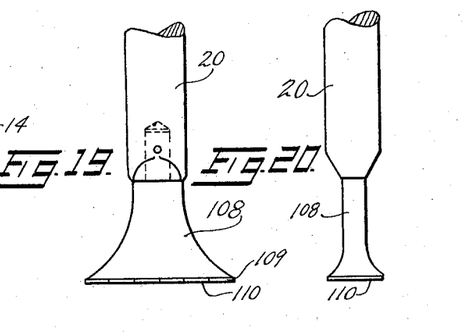
Figs. 19 and 20 are fragmental side and end elevations respectively of the plunger, with the upper part of the plunger arm broken away.
Figure 21:
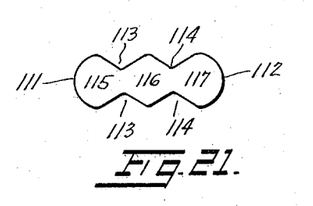
Fig. 21 is a bottom plan of the die at the end of the plunger.

The plunger rods 20 which have secured to their lower ends, as shown in Figs. 19, 20 and 21, a male die forming head 108 terminating in the die 109 the lower surface 110 of which is plane and the edges of which are irregular in the present instance having rounded end edges 111, 112, and each side edge having two depressions 113, 114 to form with the end edges 111 and 112 three laterally projecting elements 115, 116 and 117 to be engaged by the inner faces 43, 44 and 45 of the flappers 41.

In other words, each pair of flappers 41 cooperates with a die 109, the faces 43, 44, and 45 corresponding to, and conforming with, the lateral edges of a die 109 so as to receive the die 109 in its downward plunge after the flappers 41 have been brought into engagement with one another and thereupon, after lateral movement of the scraper blade 90 to open its discharge opening 35, permit the unit selected by such pair of flappers 41 to be extruded or discharged through the opening 35 by the die 109.

Figure 17:
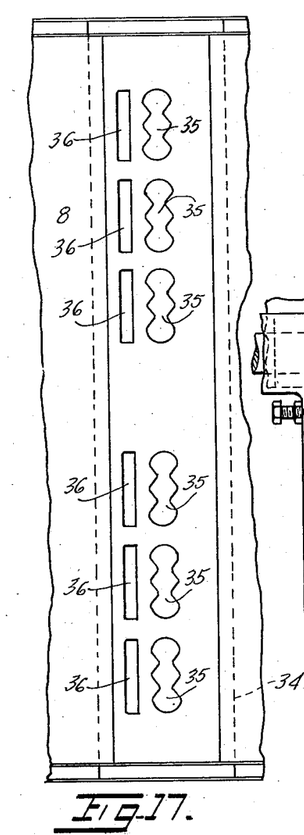
Fig. 17 is a fragmental plan of the die plate in the tank showing the discharge and return openings.
Figure 18:
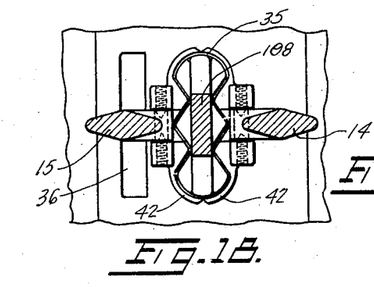
Fig. 18 is an enlarged fragmental plan of a part of the die plate in the tank showing the flapper blades in position for completing a selection operation, the thereto connected former arms in section and also the thereto connected plunger in section.

The discharging openings 35, see Fig. 17, are slightly larger than the dies 109 to permit reciprocation of the dies, but otherwise in contour, conform substantially to the contour of the dies 109.

In order to actuate the plungers 20, and thereby the dies 109, the brackets 30 and 32 which are connected thereto, through the side bars 31 and 33 respectively and the cross head 21, are each provided with a pair of ears 118 to receive a shaft 119. The shafts 119 have fixed thereon the cam rollers 120 to engage the cams 121 and 122 respectively, the cam 121 being mounted on the shaft 72 and the cam 122 on the shaft 123 supported in the brackets 124 and 125 secured to the platform P′. On the shaft 123 there is fixed the gear 126 which meshes with the gear 127 fixed on the shaft 67 between the gear 66 and the side frame B. Thus the gear 66 being actuated by the pinion 64 on the shaft 61 will drive the shaft 67 which in turn will rotate the gear 70 in mesh with the gear 71 to rotate the shaft 72 of the cam 121 and also rotate the gear 127 in mesh with the gear 126 on the shaft 123 to actuate the cam 122. The cams 121 and 122 are, of course, synchronized so that they will simultaneously raise the brackets 30 and 32 respectively to raise the plunger rods 20 and in turn simultaneously permit the brackets 30 and 32 to descend, in turn to permit the plunger rods 20 to descend. The cams 121 and 122 with their transmission are timed relative to the transmission of the scraper blades 90 and flappers 41 so that the plunger arms 20 will be caused to descend after the flappers 41 have been brought into engagement with one another after having selected units of plastic material in the tank T and after the pusher plates 90 have been moved laterally to clear the openings 35.

The ascent of the plungers 20 in turn is timed to occur after the pusher plates 90 have been brought into closing position and while the flapper arms 14 and 15 are receding from one another.

In order to insure the ascent of the frame 21 and thus maintain the rollers 120 in engagement with the cams 121 and 122 at all times, the compression springs 128 are provided which are tensed between the abutments 129 formed on the upper ends of the standards 24 and 25 and the upper ends of the side bars 31 and 33.

Cut-off blades

The next elements to function with the present method of forming units of predetermined irregular shapes are the cut-off blades. The cut-off blades serve not only finally to determine the height of the finished unit of plastic material but also serve to form or shape the upper surface of the finished product. In other words, the units extruded or discharged through the openings 35 from the tank T have a greater length than the finished product and advantage is taken of this surplus length, properly to size the finished product with regard to height and also to shape or form the upper or top surfaces of the unit in a predetermined regular or irregular surface as desired. In the present embodiment, there are illustrated elements for forming units having predetermined irregular upper surfaces.

It is a further aim of the present invention to suspend the initially extruded or discharged units and maintain them in a suspended condition before finally shaping the upper surfaces, thus permitting the plastic units slightly to expand to regain their fluffy inner texture as distinguished from a compact or compressed inner texture.

Figure 23:
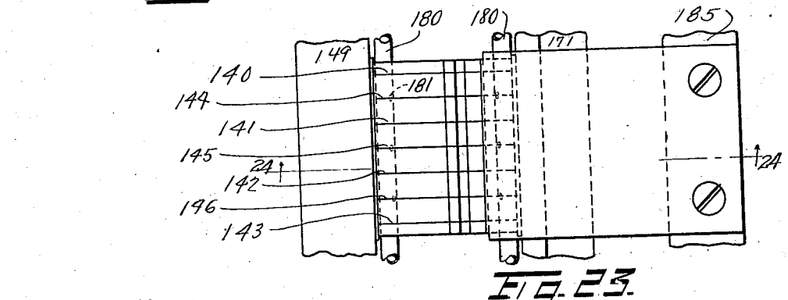
Fig. 23 is a fragmental plan showing the cut-off knives in engagement with one another, and the scraper blades in position thereon.
Figure 24:
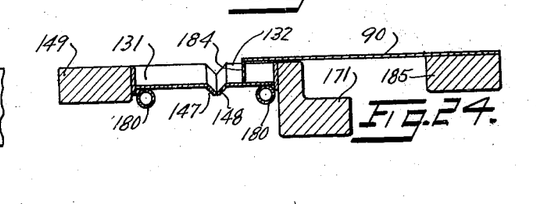
Fig. 24 is a section on the line 24—24 of Fig. 23.
Figure 25:
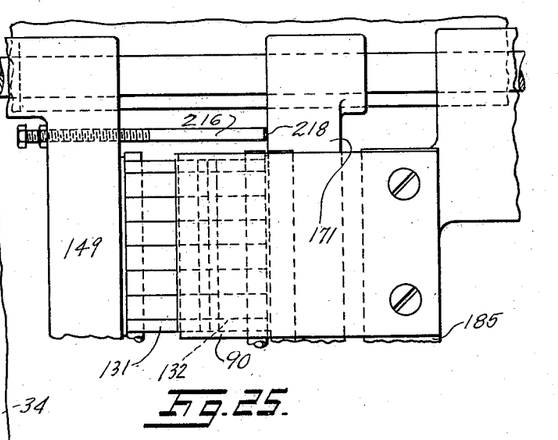
Fig. 25 is a fragmental plan of one end of the cut-off blades and scraper blades showing the stop for limiting the closing movement of the cut-off blades.

In the present instance two such cutting blades 131 and 132 are provided which move toward one another performing the severing or cutting operation as they oppose one another and come to a stop at a position where they engage one another in cutting off position, see the position illustrated in Figs. 23, 24 and 25.

Figure 22:
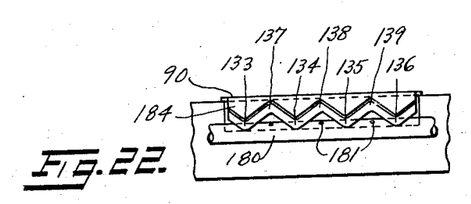
Fig. 22 is a fragmental end elevation of one of the cut-off knives showing the scraper blades in position thereon.

As shown in Fig. 4, there are in the present instance shown six cutting blades 131 and six cutting blades 132. These blades act in pairs, each pair consisting of a blade 131 and a blade 132, the shape of the blades 131 and 132, of course, is determined by the shape of the upper surface of the unit of plastic material to be produced. In the present instance, see Fig. 22, each blade 132 has four downwardly extending protrusions 133, 134, 135 and 136 to define the three upwardly extending depressions 137, 138 and 139. The blades 131 are similarly provided with four downwardly extending protrusions 140, 141, 142 and 143 to define three upwardly extending depressions 144, 145 and 146. The protrusions of the blades 132 and 131 being in alinement with one another so that when they approach one another they will, in the present instance, produce upper surfaces that have three defined protrusions corresponding with the three depressions of the blades.

To determine the closing position of the cut-off blades 131 and 132 so that they will just engage one another and thus prevent their edges being impaired should, for any reason, the timing of the transmission become out of order, a limiting stop is provided which will take the brunt of the shock in such event and thus protect the edges. The limiting stops in the present instance consist of the pins 216 and 217, screw threadedly connected to, and extending through the ends of the blade carrier 149 adjacent to the platforms P and P' respectively, the free ends 218 and 219 respectively of such pins 216 and 217 projecting sufficiently to engage the opposing edge of the blade carrier 171. The screw threaded connection of the pins 216 and 217 with the carrier 149 facilitates the ready adjustment of the extent of projection required for such pins 216 and 217.

In order to prevent the plastic material adhering to the blades, the downwardly inclined edges 147 and 148 are provided for the blades 131 and 132 respectively, such edges in the present instance being a continuation of the blades proper inclining therefrom downwardly at an angle of about forty-five degrees (45°). By means of these downwardly inclining edges 147 and 148, when the edges 147 and 148 substantially oppose one another, there will merely be a single edge in engagement with the upper surface of the severed unit thus preventing the adhesion of the units to the knives through any extended area, and thereby facilitating the separation of the units from the blades 131 and 132. In other words, due to the adhesive character of the average plastic mass of a candy composition, if the blades were plane throughout, there would be a tendency to cling to the surfaces of the blades and possibly interfere with the rapid operation of the machine. With the downwardly inclined edges 147 and 148, the possible blade surfaces to be engaged is reduced to a minimum, and thus the rapid depositing of the unit after being severed, inducive to the rapid operation of the machine, is facilitated.

The blades 131 and 132 are, of course, timed to approach one another and to engage one another for the cutting operation immediately after the scraper blades 90 have been actuated to one side, the right side in Fig. 5, and after the plungers 20 have been actuated to discharge the initially formed units from the tank T, are timed to remain so in engagement with one another until after the scraper blades 90 are again returned to closing position, the position shown in Fig. 3, where the discharge openings 35 are closed, whereupon the cutting blades may then be actuated to separate from one another into the position shown in Fig. 5.

For actuating the blades 131 and 132, suitable blade carriers are provided. For the blades 131 there is provided the blade carrier 149 consisting of an elongated bar extending the full width of the tank T having lateral arms 150 and 151, the arm 150 having downwardly extending journals 152 and 153 to receive the rod 154 supported in the brackets 155 and 156 supported on the platform P' and the arm 151 is provided with journals 157 and 158 for receiving the rod 159 to slidedly ride thereon, the rod 159 being secured in the brackets 160 and 161 mounted on the platform P. In other words, the blade carrier 149 is guided in its slidable movement to a severing position by the slidable engagement of its journals 157 and 158 on the rod 159. For actuating the blade carrier 149, the abutments 162 adjacent to the blades 131 are pivotally connected to the link 163 which is pivotally connected to the upwardly extending arm of the lever 164 which is fulcrumed to a shaft 165 journalled in the bracket 166 supported on the bars 97. The downwardly extending arm of the lever 164 has a cam face 167 thereon for engagement by the cam 168 secured on the shaft 67. For resiliently maintaining the cam face 167 in engagement with the cam 168 there is provided a spring 169 which connects the downwardly extending arm of the lever 164 with the abutment 170 on the T-section 5 adjacent to the standards 13.

For supporting the blades 132, there is provided the blade carrier arm 171 which extends substantially the full width of the tank T and is provided with lateral arms 172 and 173, the arm 172 having upwardly extending journals 174 and 175 slidably mounted on the rod 154 and the arm 173 having upwardly extending journals 176 and 177 slidably mounted on the rod 159 whereby the reciprocation of the blade carrier 171 and therewith the blades 132 will be guided. In order to actuate the blade carrier 172 simultaneously with the blade carrier 149, the downwardly extending abutment 178 formed on the blade carrier 171 is pivotally connected by the link 179 with the downwardly extending arm of the lever 164. In other words, the rocking of the lever 164 will simultaneously reciprocate both the blade carriers 149 and 171.

In order to heat the blades 131 and 132 and thus facilitate freeing the plastic material from the same in the action of the blades, each of the blades 131 and 132, as shown in Figs. 5, 6, 7 and 8, has secured to its lower face, a conduit 180 provided with perforations 181, to permit the steam to pass therefrom and play along the bottom surfaces of the blades 131 and 132 constantly to heat and to wash off such surfaces and thereby prevent the plastic material in any way collecting on such surfaces. To supply steam or hot water to such conduits 180, suitable inlets, not shown, are provided, and to permit the same to pass therefrom suitable outlets, not shown, are provided.

Scraper blades 90

The scraper or pusher blades 90 not only serve to close the discharge openings 35 while the flappers 41 approach one another in the act of selecting and initially forming units but serve also to remove the surplus material collected on the upper surfaces of the cut-off blades 131 and 132 and return such surplus material to the tank T through the return openings 36. As is clearly shown in Figs. 3, 5, 6, 7 and 8, the blades 131 and 132 are spaced from the die plate 34 a distance sufficient to permit the active scraping end or pushing end 184 to pass between the upper surfaces of the blades 131 and 132 and the lower surface of the die plate 34. The pusher ends 184 of the pusher blades 90 are merely the continuations of the blades 90 extending downwardly at an angle of approximately ninety degrees (90°) from the main body portion of the blades 90 and are substantially plane in surface having lower edges which conform to the corrugations or irregular conformations in the cut-off blades 131 and 132.

The cut-off blades 131 are slightly longer than the cut-off blades 132 as clearly shown in Fig. 3 to permit clearing the return openings 36 when the blades 131 and 132 are in closed position so that when the pusher blades then return to remove the surplus material from the upper surfaces of the blades 131 and 132, the openings 36 will be free to receive such surplus material, see Fig. 3.

For actuating the pusher blades 90, there is provided the blade carrier 185 which has lateral arms 186 and 187. The lateral arm 186 has downwardly projecting journals 188 and 189 slidably mounted on the rod 154, with the journal 175 of the arm 172 disposed between them, and the lateral arm 187 has downwardly projecting journals 190 and 191 slidably mounted on the rod 159 with the journal 177 of the arm 173 disposed between them. By means of these journal connections 188, 189, 190 and 191, the pusher blade carrier, 185 will be guided in its reciprocation. As shown in Figs. 3, 4, 5, 6 and 7 the link 93 is pivotally connected to the abutment 192 formed on the carrier 185.

For receiving the finally formed units from the cut-off blades 131 and 132, a plurality of plates 193 and 194 are provided, one set of plates 193 in the present instance for receiving the units from the three discharge openings adjacent to the platform P and the other set of plates 194 for receiving the units from the discharge openings 35 adjacent to the platform P'. The plates 193 are mounted on the conveyor chains 195 which have extending across them at intervals the projecting lugs 196 to form abutments for the plates 193 and the plates 194 are supported on the conveyor chains 197 which are provided with the projecting lugs 198 to form abutments for the plates 194. The conveyor chains 195 and 197 at one end mesh with the sprocket wheels 199 and at the other end with the sprocket wheels 200. The sprocket wheels 199 are mounted on the shaft 201 supported in the A-frames 202 and the sprocket wheels 200 are mounted on the shaft 203 supported in the A-frames 204. For actuating the conveyor chains, the sprocket wheels 199 serve as the driving members being fixedly connected to the shaft 201. The shaft 201, see Fig. 9, has secured thereon a friction wheel 205 and has loosely mounted thereon the arm 206. The arm 206 is pivotally connected to the connecting rod 207 which has a cam ring 208 mounted on the eccentric cam 209. The eccentric cam 209 is mounted on the shaft 210 fixed in the bearings 211 supported on the bars 2 and 2'. The shaft 210 has fixed thereon the gear 212 which meshes with the gear 213 fixed on the shaft 67. On the arm 206 there is pivotally connected the friction pawl 214, the free end of which is connected by the spring 215 to the arm 207. As shown in Fig. 9, by means of this friction pawl, the shaft 201 will be intermittently actuated. Such actuation is timed to take place immediately after plates 193 and 194 have received a set of finally formed units, and is timed to rest again as soon as the conveyor chains 195 and 197 are actuated and spaced slightly more than the width of one of the finally formed units.

The operation of the machine is substantially as follows: Preferably before starting the operation of the machine, the arms 14 and 15 are spaced from one another as shown in Fig. 3, with the plungers 20 in raised position, in which position the scraper blades 90 will extend across the openings 35 to close the same. Thereupon the plastic mass, preferably heated, may be poured into the tank T. Hot steam is preferably conveyed into the jacket formed by the walls 7 and 9 of the tank T to heat the walls 7 and 9 of the tank T in turn to transmit heat to the plastic mass, thereby to maintain such plastic mass at a temperature where it is sufficiently fluid to be easily manipulated. Thereupon the machine may be started, whereby the flappers 41 at the lower ends of the gathering arms 14 and 15 will be caused to move toward one another into the position shown in Fig. 5, there to collect or select units of materials when the cut-off blades 131 and 132 are simultaneously caused to recede from one another into the position shown in Fig. 5; thereupon the scraper blades 90 will be caused to recede to free the openings 35, as shown in Fig. 6; thereupon the plungers 20 will be caused to descend into the position shown in Fig. 7 where they will extrude the units collected; thereupon the cut-off blades 131 and 132 will approach one another into the position shown in Fig. 8 to cut off the upper portions of the units collected and form the upper surface of the units; and thereupon the scraper blades 90 will return into the position shown in Fig. 3 to take this surplus material cut off the tops of the units and return it through the openings 36 into the tank T. As the units are engaged by the cut-off knives 131 and 132, they will drop from the lower edges of the knives 131 and 132 onto the tins 193 and 194 carried by the conveyor chains 195 and 197. Immediately after the cut-off action of the knives 131 and 132 has taken place, the steam will be caused to issue from the openings 181 in the tubes 180 to strike the lower surfaces of the cut-off knives 131 and 132 to free the same from any material that might there collect.

It is obvious that various changes and modifications may be made in the steps of the method and in the details of construction of the machine illustrated without departing from the general spirit of the invention as set forth in the appended claims.

I claim:

1. The method of forming units of plastic material consisting in selecting a unit of material from a mass of plastic material contained in a tank, simultaneously with such selecting operation forming the sides of the unit selected, thereupon extruding such selected unit, and finally forming the top of the extruded unit after it has been extruded.

2. The method of forming a unit of plastic material consisting in initially selecting a unit of material from the plastic mass in a container, simultaneously with such selecting action forming the sides of the unit selected, thereupon extruding the unit selected, and thereupon while the unit selected is still in suspended position, cutting off the upper portion of the unit selected to form the upper surface of the finally formed unit.

3. The method of forming a plastic unit from a mass of plastic material contained in a tank, consisting in selecting a unit from the plastic mass in the tank and simultaneously therewith forming the sides of the selected unit, and thereupon extruding the selected unit from the tank in a vertical direction to permit it to be suspended before it is deposited after leaving the tank.

4. The method of forming candy centers or the like, consisting in selecting a candy center from a plastic mass, thereupon removing the center selected, and thereupon shaping the upper surface of the same by removing portions thereof and simultaneously therewith returning the removed portions to the initial mass.

5. The method of forming candy centers or the like, consisting in selecting a candy center from a plastic mass and simultaneously therewith forming the sides thereof, thereupon removing the center selected, and thereupon removing portions of the center selected to form the upper surface thereof and simultaneously therewith returning the removed portions to the initial plastic mass.

6. The combination with a support for a plastic mass, of formers for selecting a unit from said plastic mass and initially forming the same, there being a discharge opening in said support, and means for extruding the unit selected through said discharge opening.

7. The combination with a support for a mass of plastic material, of a pair of selecting arms, operatively mounted relative to said support, means for rocking said arms to and fro, forming blades at the ends of said arms cooperating with one another to select a unit of material from the mass located on said support when they approach one another, means for arresting the movement of said arms when the forming blades engage one another after having selected a unit of material, and means for engaging the unit selected while the arms are arrested and removing such selected unit.

8. The combination with a support for a mass of plastic material, of a plurality of selecting arms, operatively mounted relative to said support, and forming blades pivotally connected to the ends of the selecting arms and adapted to pass through the mass of plastic material on said support in order to select a unit of plastic material, the pivotal connection between said arms and blades consisting of recesses in the arms and pins secured to the blades and extending into the recesses, whereby the pivotal connection of the blades will be protected from being gummed up with the plastic material.

9. The combination with a support for a mass of plastic material, of a plurality of selecting arms, operatively mounted relative to said support, and forming blades pivotally connected to the ends of the selecting arms and adapted to pass through the mass of plastic material on said support in the act of selecting a unit of plastic material, the pivotal connection between said arms and blades consisting of shallow tapered recesses in the arms and pins secured to the blades and extending into the recesses whereby the pivotal connection of the blades will be protected from being gummed up with the plastic material.

10. The combination with a support for a mass of plastic material, of formers operatively mounted relative to said support for selecting a unit from said plastic mass and initially forming the same, there being a discharge opening in said support, and a plunger for engaging the unit selected and extruding the same through said discharge opening.

11. The combination with a support for a mass of plastic material, of a plurality of selecting arms, operatively mounted relative to said support, forming blades pivotally connected to the ends of the selecting arms and cooperating with one another to select a unit of plastic material from the mass located on said support, and a plunger for engaging the unit selected and removing the same.

12. The combination with a support for a mass of plastic material, of a plurality of pivotally mounted formers operatively mounted relative to said support and cooperating with one another to select a unit of material from the mass located on said support when they approach one another, there being a discharge opening in said support, and a plunger for engaging the unit selected and discharging the same through said discharge opening.

13. The combination with a tank having a curved bottom, for containing a mass of plastic material, of a pair of formers pivotally mounted to travel in a curved path of movement corresponding to the curved bottom of the tank and cooperating with one another to select a unit of material when they approach one another, there being a discharge opening in the bottom of said tank normally closed, a plunger for engaging the unit selected and discharging the same through said discharge opening, and means for opening said discharge opening during the discharging action of said plunger.

14. The combination with a support for a mass of plastic material, of a pair of shafts above said support, an arm secured to each of said shafts, means for actuating said shafts to cause said arms to approach, and recede from, one another, former blades at the ends of said arms cooperating with one another to select a unit from the plastic mass when they approach one another, a plunger, a die located at the end of said plunger and conforming to the faces of the former blades, there being a discharge opening in said support conforming to the shape of the die, a closure for said discharge opening, means for vertically reciprocating said plunger to cause said plunger to descend and engage the unit selected by said former blades and discharge the same through said discharge opening, and means for opening the said closure during the discharging action of said plunger.

15. The combination with a support for a mass of plastic material, of formers actuatable to select a unit from said mass, there being a discharge opening in said support, a plate for closing said discharge opening while said formers select a unit and for opening said discharge opening after the unit has been selected, and means for engaging the unit selected and extending the same through said discharge opening when said plate has been actuated to open the same.

16. The combination with a support for a mass of plastic material, of blades operatively mounted relative to said support for initially selecting a unit from said mass of material, there being a discharge opening in said support, a plunger for discharging the unit selected through said discharge opening, and forming knives for engaging the unit discharged to size and shape the same.

17. The combination with a support for a mass of plastic material, of blades operatively mounted relative to said support for initially selecting a unit from said mass of material and forming the sides thereof, there being a discharge opening in said support, a plunger for engaging the unit selected and discharging the same through said discharge opening, and former blades engaging the unit while it is being discharged and cutting off portions of it to form and shape its upper surface.

18. The combination with a support for a mass of plastic material, of blades operatively mounted relative to said support, means for actuating said blades to approach one another and pass through said mass of material to select a unit from said mass, means for removing the unit selected by said blades, a pair of cut-off knives, means for actuating said cut-off knives to approach one another and sever portions from the upper end of said selected unit to shape the upper surface thereof.

19. The combination with a support for a mass of plastic material, of a pair of formers operatively mounted relative to said support for selecting a unit from said mass, means for removing the unit selected, cut-off knives for engaging the unit removed and forming its upper surface, and means for moistening the knives to facilitate freeing the same from the plastic material.

20. The combination with a support for a mass of plastic material, of a pair of formers operatively mounted relative to said support for selecting a unit from said mass, means for removing the unit selected, cut-off knives for engaging the unit removed and forming its upper surface, and means for heating and moistening the knives to facilitate freeing the same from the plastic material.

21. The combination with a support for a mass of plastic material, of a pair of formers operatively mounted relative to said support for selecting a unit from said mass, means for removing the unit selected, cut-off knives for engaging the unit removed and forming its upper surface, a perforated conduit secured to the lower surface of each knife, and means for conducting a heated fluid through said conduit and cause the same to pass through the perforated conduits into engagement with the lower surfaces of the knives to free the same from the plastic material that may cling thereto.

22. The combination with a support for a mass of plastic material, of a pair of formers operatively mounted relative to said support for selecting a unit from said mass, means for removing the unit selected, cut-off knives for engaging the unit removed and forming its upper surface, a conduit having perforations therein secured to the lower surface of each knife, and means for conducting steam into said conduits to cause the same to pass through said perforations into engagement with the lower surfaces of said knives to free the same of any plastic material that may cling thereto.

23. The combination with a support for a mass of plastic material, of formers operatively mounted relative to said support for selecting a unit and forming the sides thereof, means for discharging the unit downwardly from said support, and cut-off knives for engaging the unit as it is being discharged and forming its upper surface, the knives having cutting edges bent downwardly at an angle to the main body of the knives to facilitate freeing the knives from the plastic material that may cling thereto.

24. The combination with a support for a mass of plastic material, of formers operatively mounted relative to said support for selecting a unit from said mass, there being a discharge opening in said support, a plunger for engaging the unit selected and discharging it down through said discharge opening, cut-off knives disposed below said support and engaging the unit as it is discharged to remove the surplus material from its upper end thereby to shape the upper surface of the finally formed unit, a scraper plate, and means for actuating said scraper plate to traverse the upper surfaces of said cut-off knives to remove the surplus material there lodged.

25. The combination with a support for a mass of plastic material, of formers for selecting a unit from said mass, there being a discharge opening in said support, a plunger for engaging the unit selected and discharging it down through said discharge opening, cut-off knives disposed below said support and engaging the unit as it is discharged to remove the surplus material from its upper end thereby to shape the upper surface of the finally formed unit, a scraper plate, and means for actuating said scraper plate to traverse the upper surfaces of said cut-off knives to remove the surplus material there lodged, there being a return opening in said support to receive the surplus material from said scraper plate and return it to the upper surface of the support.

26. The combination with a tank for a mass of plastic material, of side forming blades, means for actuating said side forming blades to select a unit from said mass and simultaneously form the sides thereof, there being a discharge opening in the bottom of said tank, there being a return opening in the bottom of said tank adjacent to said discharge opening, a plunger, means for actuating said plunger to engage the unit selected and discharge it through said discharge opening, upper surface forming means for engaging the unit discharged and forming the upper surface thereof, and a conveyor below said upper surface forming means for receiving the unit from said upper surface forming means.

27. The combination with a tank for a mass of plastic material, of formers, means for actuating said formers to select a unit from said mass, there being a discharge opening in the bottom of said tank, there being a return opening in the bottom of said tank adjacent to said discharge opening, a plunger, means for vertically reciprocating said plunger to engage the unit selected and discharge the same down through said discharge opening, cut-off blades, means for actuating said cut-off blades to remove portions of the unit discharged to form the upper surface thereof, a scraper blade, and means for actuating said scraper blade to traverse the upper surfaces of said cut-off blades to remove the surplus material lodged thereon and return it to the tank through said return opening.

28. The combination with a tank for a mass of plastic material, of corrugated side forming blades, means for actuating the said side forming blades to approach one another and select a unit from said mass, and simultaneously form the sides thereof, there being a discharge opening in the bottom of said tank conforming to the lateral contour defined by the side forming blades, there being a return opening in the bottom of said tank adjacent to said discharge opening, a plunger, a die on the lower end of said plunger conforming in shape to the lateral contour defined by the side forming blades, means for actuating said plunger to engage the unit selected and pass down between said side forming blades to discharge the unit selected through said discharge opening, corrugated upper surface forming blades, means for actuating said upper surface forming blades to approach one another thereby to engage the unit discharged and remove portions from the upper end thereof to form the upper surface of the unit discharged, a scraper blade having an upper plane surface and an advance face having a lower corrugated edge conforming to the contour defined by the upper surface forming blades, and means for actuating said scraper blade to cause the corrugated edge of its advance face to engage and traverse the upper surfaces of the forming blades to remove the surplus material lodged thereon and return it to the tank through said return opening.

29. The combination with a support for a plastic mass, of selecting arms, there being a discharge opening in said support, means for actuating said arms to select a unit from said plastic mass and locate the unit selected in position to be discharged through said opening, and means for extruding the unit selected through said discharge opening.

30. The combination with a support for a plastic mass of material, there being a discharge opening in said support, a closure plate for the discharge opening, means for opening said closure plate to permit a portion of said plastic mass to be extruded into suspended position, the closure plate being plane to form a plane bottom surface on the portion being extruded, and a forming member for separating a unit from the portion extruded and forming an ornamental upper surface on said unit.

31. In a machine of the class described, the combination with a plastic mass containing tank, having a discharge opening at its lower end, a plunger for discharging a unit of material through said discharging opening, cut-off means for forming the upper surface of the unit discharged, there being a return opening in the bottom of said tank, a scraper blade operable above said cut-off means to return the cut-off surplus into said tank through said return opening, and means for causing said discharging plunger to start its return movement when said scraper functions to return the surplus material to relieve the pressure in said tank at said return opening.

WILLIAM BARTLETT LASKEY.